United States Patent

Skuratovsky et al.

[11] Patent Number: 4,871,908
[45] Date of Patent: Oct. 3, 1989

[54] OVERLOAD PROTECTION FOR FIBER OPTIC MICROBEND SENSOR

[75] Inventors: Eugene Skuratovsky, Mayfield Heights, Ohio; James K. Knudsen, East Greenwich, R.I.

[73] Assignee: The Babcock & Wilcox Company, New Orleans, La.

[21] Appl. No.: 112,650

[22] Filed: Oct. 22, 1987

Related U.S. Application Data

[63] Continuation-in-part of Ser. No. 825,414, Feb. 3, 1986, abandoned.

[51] Int. Cl.[4] ................................................. H01J 5/16
[52] U.S. Cl. .................................. 250/227; 250/231 R
[58] Field of Search .............. 250/227, 231 R, 231 P; 73/705; 350/96.1

[56] References Cited

U.S. PATENT DOCUMENTS

| | | | |
|---|---|---|---|
| 4,342,907 | 8/1982 | Macedo et al. | 73/705 |
| 4,459,477 | 7/1984 | Asawa et al. | 73/705 |
| 4,552,026 | 11/1985 | Knudsen et al. | 250/231 R |
| 4,557,550 | 12/1985 | Beals et al. | 250/227 |
| 4,560,016 | 12/1985 | Ibanez et al. | 250/227 |
| 4,678,903 | 7/1987 | Wlodarczyk et al. | 250/227 |

FOREIGN PATENT DOCUMENTS 2125161 2/1984 United Kingdom .

Primary Examiner—David C. Nelms
Attorney, Agent, or Firm—Vytas R. Matas; Robert J. Edwards

[57] ABSTRACT

Jaws of microbend sensor have corrugations and hold an optical fiber therebetween. One jaw is movable with respect to the other for squeezing and bending the optical fiber between the corrugations. The amount of bending modulates light passing through the fiber which can be a measurement of the relative movement between the jaws. The relative movement can be a mechanical input of a microbend sensor for sensing a process variable, for example a flow rate in a vortex shedding flowmeter. According to the invention, the corrugations of each jaw comprise flat areas lying in a common plane for each jaw extending perpendicularly to the displacement direction of the jaws, and projections extending parallel to the displacement direction of the jaws and positioned between the flat areas. The projections of each jaw are positioned to face the flat area of the other jaw with the optical fiber being held between the projections. Upon receiving an overload which tends to press the jaws together, the projections of one jaw press bends of the optical fiber against flat areas of the other jaw.

5 Claims, 6 Drawing Sheets

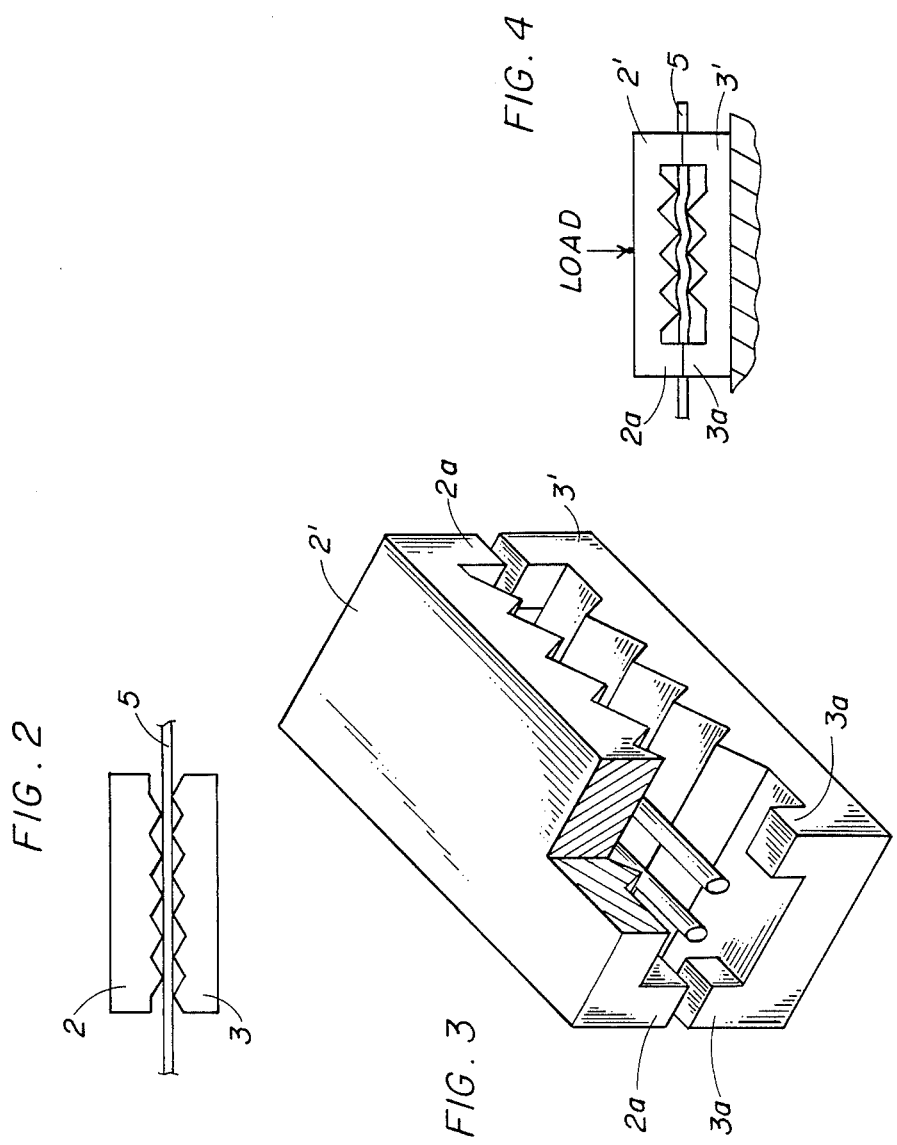

OVERLOAD PROTECTION FOR FIBER OPTIC MICROBEND SENSOR

This application is a continuation-in-part of application Ser. No. 825,414 filed Feb. 3, 1986, now abandoned.

FIELD AND BACKGROUND OF THE INVENTION

The present invention relates in general to sensors which utilize optical fibers, and in particular to a new and useful arrangement for the jaws in a microbend sensor which squeeze an optical fiber to modulate a light signal passing therethrough.

Optical fibers or cables are known which can be used to convey light between a light source and a light detector. Light in the fiber can be modulated by bending or otherwise distorting the fiber. This produces a modulated signal which can be picked up and processed by the light detector.

In a microbend sensor, for example of the type used in a vortex shedding flowmeter, a sensing body or beam extends into a flow of fluid for which flow rate is to be measured. By positioning a bluff or obstruction in the flowing fluid, vortices are formed by fluid passing over and being shed from the bluff. The vortices move the beam as they pass it. The frequency of the vortices can be used as a measurement of the flow rate.

In a microbend sensor, the sensor beam or body has an end which is mechanically connected to one corrugated jaw of a two jaw arrangement. The other corrugated jaw is fixed in a housing of the sensor and a fiber optic cable is held between the corrugated jaws. The movement of the beam causes squeezing and releasing of the fiber optic cable. Light passing through the cable is thus modulated at a frequency corresponding to the passage of vortices in the fluid flow. In such microbend sensors, care should be taken to avoid overstressing of the optical fiber. This can reduce fiber life. The fiber can be overstressed not only during the sensing operation, but also during a calibration step where the jaws are moved together by a selected amount in an initial calibration step. The jaws can inadvertently be pushed too closely together thereby damaging the optical fiber.

SUMMARY OF THE INVENTION

The present invention is drawn to a specific configuration for the jaws of a microbend sensor which can accommodate overloads without adversely affecting an optical fiber held between the jaws.

To this end, each corrugated jaw has alternating corrugations having flat areas lying in a common plane extending perpendicularly to the direction of relative motion between the jaws, with peaks between the flat areas. The projections of one jaw are positioned intermediate the projections of the other jaw and the optical fiber is held between the projections. When exposed to an overload condition pressing the jaws together, the projections move a portion of the fiber engaged by each projection against a juxtaposed flat surface of the other jaw. This evenly distributes the load across the fiber and avoids damage to the fiber.

The length of each projection in the direction of relative movement between the jaws is selected to be equal to a maximum allowable deflection in the microbend sensor. This is determined by several factors including for example the allowable stresses on the optical fiber. Once each portion of the fiber has been bent into contact with the flat area of one of the jaws, no further bending is possible. In this way the fiber cannot be overstressed.

During normal operation, light passing through the optical fiber is modulated by the local bending of the fiber by each of the projections on the jaws. This bending produces a light loss in the optical fiber which can be read as a signal corresponding to movement of the one of the jaws with respect to the other jaw.

Accordingly an object of the present invention is to provide the jaws or plates for microbend sensor which avoid overbending and overstressing of the optical fiber held between the jaws and which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a side elevational view of corrugated jaws for a microbend sensor, for example of the type shown in FIG. 1, which have no overload protection.

FIG. 3 is a perspective view with portions cut away of the jaws in a microbend sensor with one form of overstress protection.

FIG. 4 is a side elevational view of the structure shown in FIG. 3, showing an overload condition;

DESCRIPTION OF THE PREFERRED EMBODIMENT

Figure 1:
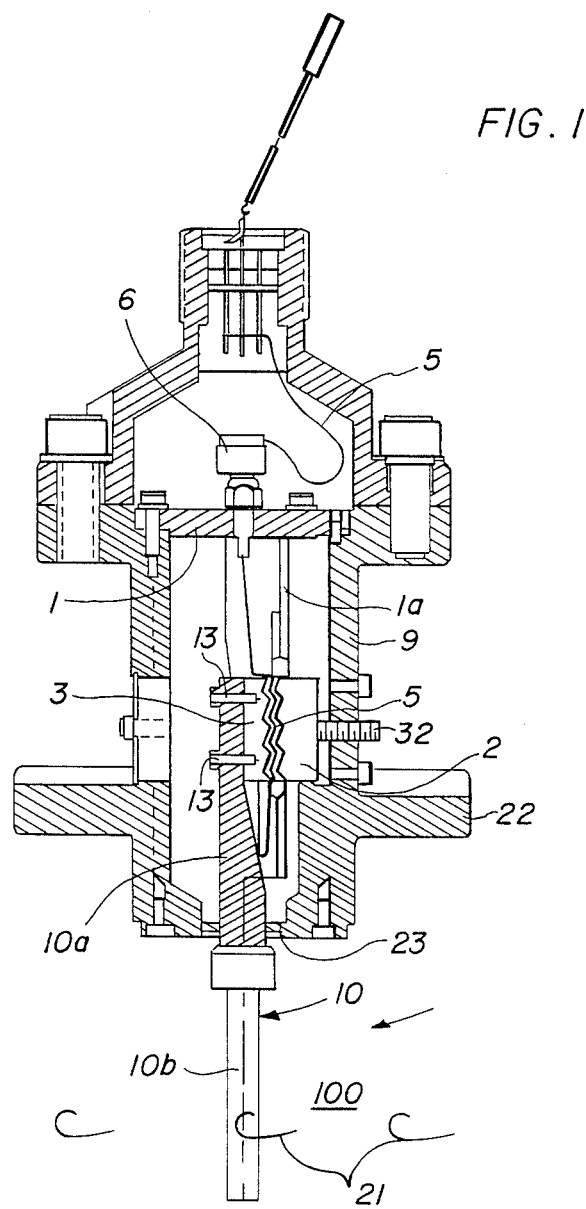
FIG. 1 is a side sectional view of a microbend sensor in a vortex shedding flowmeter using corrugated jaws.

Referring to FIG. 1 in particular, a microbend sensor is shown which is used to sense the passage of vortices 21 in a fluid flow 100 on one side of a sensor housing 9 for the sensor, having a flange 22 for isolating the sensor from the fluid flow 100.

A sensor beam 10 has a first upper portion 10a which extends upwardly into the sensor space 9, and lower second portion 10b which extends from the sensor housing flange 22 into the fluid flow space 100. Pressure boundary means 23, for example in the form of a flexible diaphragm which is connected to housing 9, isolate the sensor space in housing 9 from the fluid space 100 on the opposite side of flange 22.

A sensor assembly is mounted in the sensor space of sensor housing 9. It comprises a mounting bracket 1 which has an upper flange portion that is fixed to housing 9.

Mounting bracket 1 has a part 1a that forms a frame or fixture for holding the sensor assembly. The sensor assembly comprises a first microbend jaw 2 that is attached to the mounting bracket part 1a by means of a spring or the like. A second microbend jaw 3 is held to jaw 2 with a fiber optic cable or fiber 5 being located between the two jaws. The fiber optic cable terminates in connectors 6 which are attached to the mounting bracket 1. Connectors 6 are used for coupling a light signal to circuitry (not shown) for analyzing light passing through the optical cable 5. The cable 5 is supported and positioned by the mounting bracket 1. Microbend jaw 3 is held fast to the first portion 10a of sensor beam 10 by bolts 13.

When assembled, jaw 3 is rigidly held with respect to the sensor beam 10 which serves as a mechanical input to the sensor assembly.

When vortices 21 in space 100 pass the second portion 10b of beam 10, beam 10 is caused to pivot about its diaphragm 23. This pivotal movement is transferred to the jaw 3 which, in cooperation with jaw 2, squeezes and releases the optical fiber 5. This modulates light passing through the fiber. These modulations can be read and correspond to the passage of the vortices.

An adjustment screw 32 is threaded into the sensor housing 9 and adjusts the position of jaw 2. This provides an initial adjustment for the sensor assembly.

FIG. 2 is a side elevational view of jaws 2 and 3 with optical fiber 5 therebetween. The corrugations are in simple zig-zag form with peaks of the corrugations of one jaw overlying valleys of the corrugations of the other jaw. If jaws 2, 3 of FIG. 2 are overloaded in a direction toward each other, they may bend the length of fiber 5 into a bend with smaller radius than the fiber can accommodate. This overstresses the fiber, leading to excessive wear or damage.

FIG. 3 shows one embodiment of the present invention wherein jaws 2' and 3' may be provided with corner projections 2a and 3a. As shown in FIG. 4, when the jaws receive a load or overload, the jaws can move together only to the extent permitted by the projections 2a, 3a. This limits the amount of bending of the optical fiber 5.

Jaws 2' and 3' with their stop projections 2a and 3a are difficult and complicated to manufacture and require close tolerances to avoid overbending of the optical fiber 5.

Figure 5:
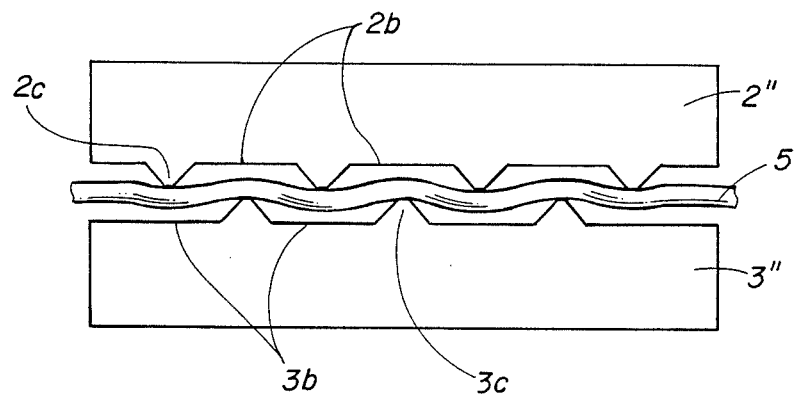
FIG. 5 is a side elevational view of the inventive corrugated jaws.
Figure 6:
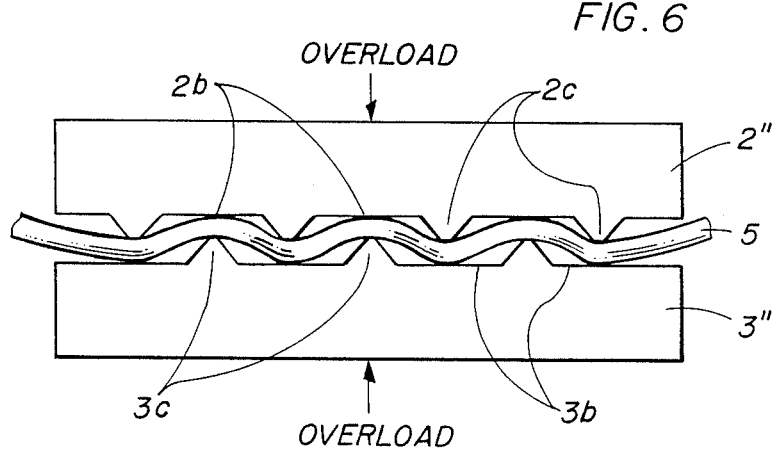
FIG. 6 is a view similar to FIG. 5 showing the jaws in an overloaded condition under which condition the optical fiber is still not overstressed.

The jaws in an alternative embodiment of the present invention are shown in FIGS. 5 and 6.

As shown in FIG. 5, each jaw 2", 3" has a corrugated portion made up of trough areas 2b, 3b which are separated by projections 2c, 3c. Each projection of one jaw is positioned to face a trough area of the adjacent jaw and optical fiber 5 is held between jaw projections.

FIG. 5 shows the intermediate position with jaws 2", 3" being movable together by an intermediate load.

FIG. 6 shows an overload condition where the increases in load do not result in increased bending stress on the fiber which cannot deflect further. Projections 3c of jaw 3", and the projections 2c of jaw 2" have pressed bends of the optical fiber 5 up against areas 2b, 3b respectively.

In accordance with the invention each section of fiber 5 can be bent only to a selected minimum radius which is assured by the height of the projections 2c, 3c, corrugation period, and fiber diameter.

Each flat area 2b, 3b lies in a single plane in each jaw respectively, which plane extends perpendicularly to the relative displacement direction of the jaws 2", 3".

Figure 7:
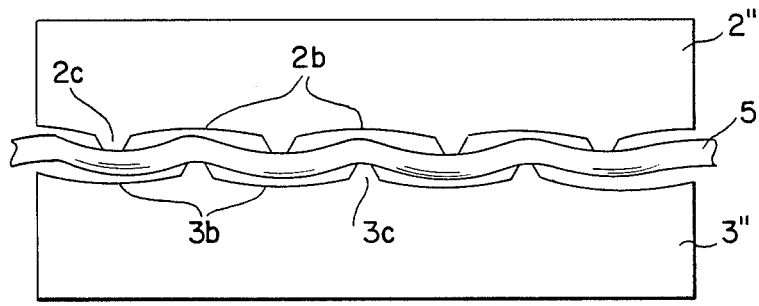
FIG. 7 is a side elevational view of an alternative corrugated jaw pattern.
Figure 8:
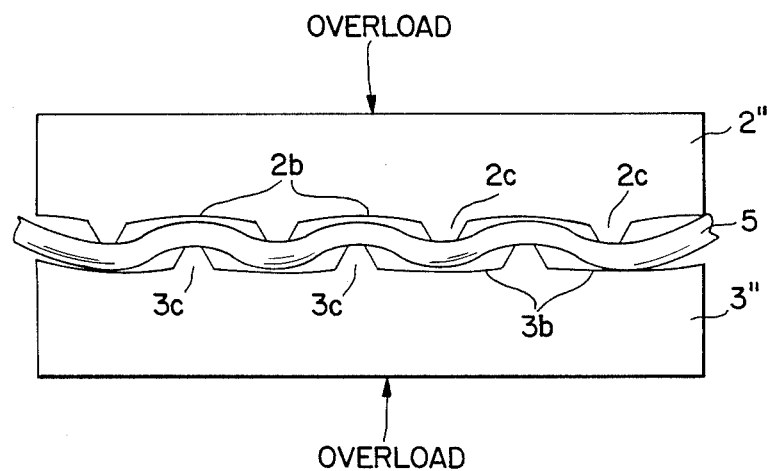
FIG. 8 is a view similar to FIG. 7 showing the jaws in an overload condition wherein the optical fiber is not overstressed.

Different corrugation patterns can also be used for the jaws. For example the flat surfaces may be slightly concave with respect to the space between the jaws, as shown in FIG. 7. This can produce line contact between the fiber and the jaw in order to lower the stresses during overload conditions. The surfaces of the jaws may also be made of a softer material, i.e. material with greater elasticity than the rest of the jaw, in order to reduce contact stresses as well as to reduce stresses due to impact. For the same reason the fiber itself may be coated, for example with aluminum. Another possibility would be to use flat surfaces on only one of the jaws thus making the second jaw more cheaply. As little as two flat areas can be used.

EXAMPLE

An optical fiber is squeezed between corrugated plates by the pivoting beam motion at the vortex shedding frequency. The peak beam displacement results in a peak amplitude of spatial fiber distortion along the length of the plates. Optical power propagating in the fiber core is attenuated in proportion to the spatial distortion amplitude via coupling from propagation to radiation modes. The power lost from the core to radiation modes is a maximum when the fiber spatial bend frequency equals the difference in propagation constants $\Delta B$ is between propagating and radiation modes.

$$\Delta B = \pm \frac{2\pi}{\Lambda} \quad (1)$$

where $\Lambda$ is the corrugation spacing [1]. For step index fibers, $\Delta B$ is given by [2]

$$\Delta B = B_{m+1} - B_m = \frac{2\Delta^{\frac{1}{2}}}{a} \frac{m}{M} \quad (2)$$

where a is the fiber core radius, m the mode number, M the total number of modes and $\Delta$ is the normalized core-clad refractive index difference $\Delta = (^m\text{core} - ^m\text{clad})/^m\text{clad}$. For the specific multimode aluminum coated optical fiber we have examined for this application $\Delta = 0.003$ and $a = 60\pi\text{m}$. For this weakly guiding fiber, the higher order modes are preferentially coupled to adjacent higher order modes and radiation modes by the periodic distortion applied to the fiber by the corrugations. For these higher order modes, the mode number is about equal to the total number of modes, and combining Eq. (1) and (2), the optimum corrugation spacing may be calculated.

$$\Lambda = \frac{\pi a}{\Delta^{\frac{1}{2}}} = 3.4 \text{ mm} \quad (3)$$

Figure 9:
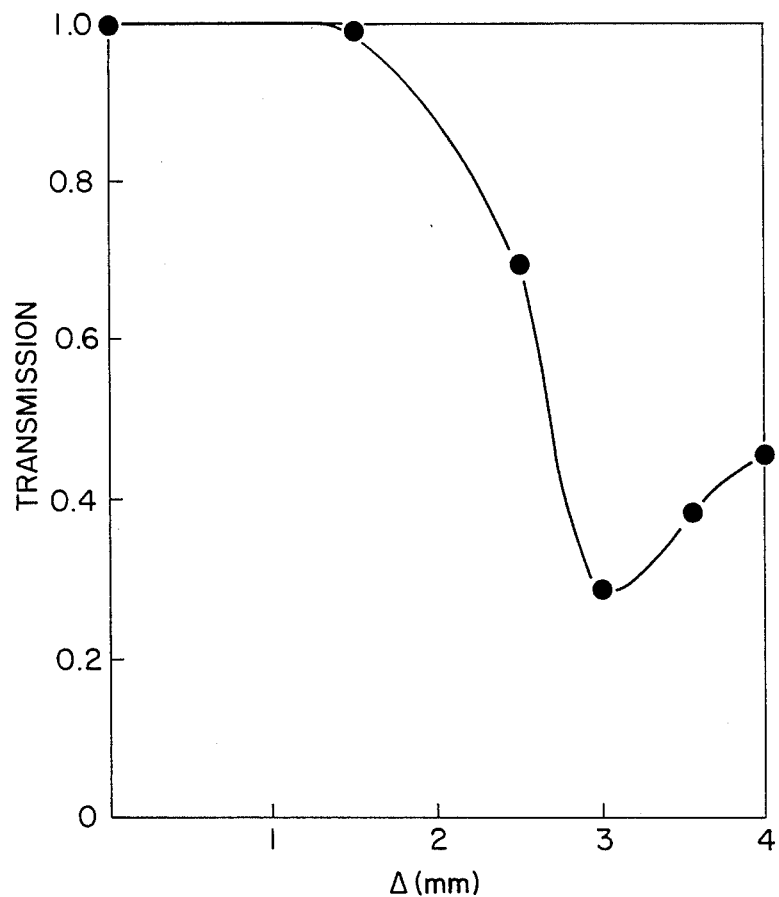
FIG. 9 is a graph of transmission vs. corrugation spacing for an aluminum coated optical fiber loaded with eleven spatial bends at a load of 27 Nt between optical corrugations.

This result was verified experimentally by measuring the transmission loss through an aluminum coated optical fiber as a function of corrugation spacing. The number of corrugations and load on the fiber were held constant. The transmission goes through a minimum at a spacing of 3 mm, as shown in FIG. 9. This result agrees fairly well with the calculated value from Eq. 3.

Figure 10:
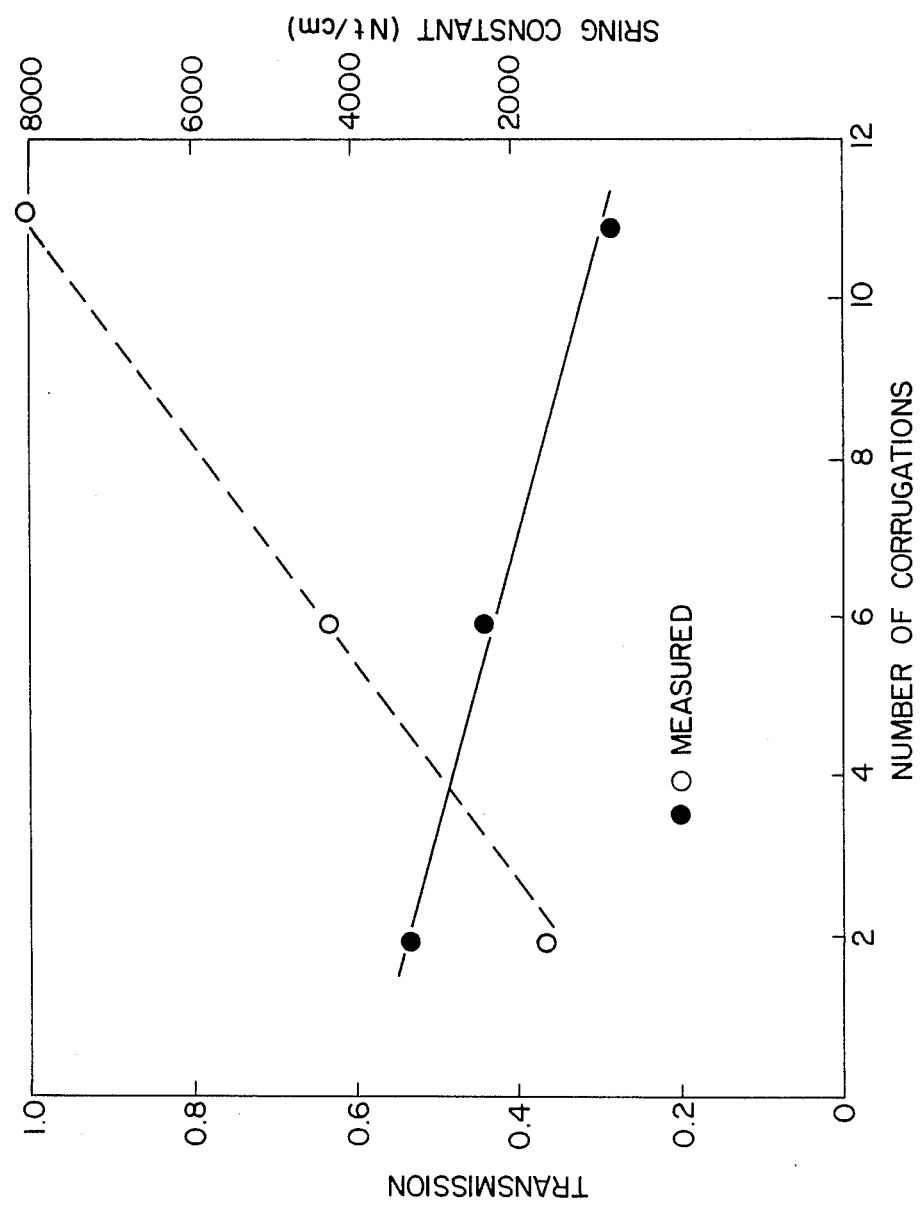
FIG. 10 is a graph of transmission and spring constant vs. the number of corrugations at 3 mm spacing.

Plotted in FIG. 10 are the transmission and spring constant vs the number of corrugations at 3 mm spacing. Corrugations in steel and brass blocks were used to make these measurements. The load was held constant at 27 Nt for the transmission measurements. From FIG. 10, the spring constant is about 5000 Nt/cm for plates with seven corrugations and a 0.15 mm width at the corrugation crest. For the specific corrugations used in the flowmeter sensor plates, the crests had a 0.76 mm radius. For this specific case the measured spring constant was 8800 Nt/cm. For micrometer displacements around a load of 27 Nt, the load may be assumed to change linearly with displacement.

Calculation of displacement under a given load is very complex because an optical fiber is a composite system, i.e. a combination of glass, metal and plastic materials, because the peaks and corrugations are rounded rather than sharp and because the coating/cladding is usually made of a material softer than the metallic peaks, e.g. plated gold, aluminum or organic materials such as gold, aluminum or organic materials such as polyimide, thereby causing dents or deformation of the optical fiber. These factors can result in significant deviation in actual results over the theoretical calculations discussed in the above example. In applications where such error is significant, displacement can be measured at varous loads up to the breakage of the fiber. Maximum allowable displacement would then be calculated as follows:

$$Y \text{ Allowed} = \frac{Y \max}{n}, \text{ where}$$

Y max is the displacement when the fiber breaks n is a safety factor 1.

For example, a fiber with a 125 mm core, 190 mm cladding, 260 mm coating diameter (glass/glass/aluminum) and a 3 mm spacing of stainless steel peaks, Y max $\approx$ 0.002 inch (static) and 0.0005 inch to survive a $10^7$ cycle fatigue test.

While specific embodiments of the invention have been shown and described in detail to illustrate the application of the principles of the invention, it will be understood that the invention may be embodied otherwise without departing from such principles.

What is claimed is:

1. A jaw arrangement for a microbend sensor comprising a pair of jaws each having corrugated surfaces for holding an optical fiber therebetween and being moveable with respect to each other for bending the optical fiber to modulate light passing through the optical fiber, each corrugated surface comprising a plurality of flat areas lying in a common plane in a direction perpendicular to the relative movement direction for the jaws, and a plurality of projections extending in the direction of relative movement of the jaws wherein the height of each projection of each jaw in the direction of relative movement of the jaws is selected to achieve optical fiber bending to a selected minimum radius, said projections alternating with said flat areas, projections of one of said jaws being positioned over flat areas of the other of said jaws to bend the optical fiber therebetween, said jaws being moveable together under an overload condition whereby the optical fiber is bent by projections of one jaw against flat areas of the other jaw.

2. A jaw arrangement according to claim 1, wherein each area between projections is concave with respect to a space between said jaws.

3. A jaw arrangement according to claim 1, wherein each jaw is made of softer material in its contact flat areas than in a remainder of each jaw.

4. A jaw arrangement for a microbend sensor comprising a pair of jaw plates having an optical fiber therebetween, at least one of said jaw plates having at least two flat areas lying in a plane perpendicular to a direction of relative movement of said jaws together and apart for bending the optical fiber, with at least one projection between said flat areas extending in the direction of relative movement between said jaws.

5. A jaw arrangement for a microbend sensor comprising a pair of jaw plates having an optical fiber situated therebetween and being movable with respect to each other for bending the optical fiber to modulate light passing through the optical fiber, each corrugated surface comprising a plurality of trough areas, a plurality of jaw projections extending in the direction of relative movement of the jaws and at least one stop projection, said jaw projection alternating with said trough areas, jaw projections of one of said jaw plates being positioned over trough areas of the other of said jaw plates to bend the optical fiber situated therebetween and stop projections of one of said jaw plates being positioned over stop projections of the other of said jaw plates so as to limit the movement of only said jaws together without bending the optical fiber therebetween under an overload condition thereby limiting the bending by the projection of one jaw against trough areas of the other jaw.

* * * * *